United States Patent [19]

Godai et al.

[11] 4,345,140

[45] Aug. 17, 1982

[54] COMPOSITE WIRE FOR STAINLESS STEEL WELDING

[75] Inventors: Tomokazu Godai; Shoji Minato, both of Kamakura; Katushi Nishimura, Fujisawa; Tsuneshi Ogawa, Kamakura, all of Japan

[73] Assignee: Kobe Steel, Ltd., Kobe, Japan

[21] Appl. No.: 160,930

[22] Filed: Jun. 19, 1980

[30] Foreign Application Priority Data

Jun. 22, 1979 [JP] Japan ................................. 54-79547

[51] Int. Cl.$^3$ ........................................... B23K 35/362
[52] U.S. Cl. ................................. 219/146.23; 148/24; 148/26; 219/145.22
[58] Field of Search ...................... 219/145.22, 146.23; 148/24, 26

[56] References Cited

U.S. PATENT DOCUMENTS

| 1,762,483 | 6/1930 | Norwood | 219/146.23 |
| 2,544,334 | 3/1951 | Linnert | 148/26 X |
| 3,078,363 | 2/1963 | Johnson | 219/146.23 X |
| 4,109,059 | 8/1978 | Haeck | 219/145.22 X |
| 4,125,758 | 11/1978 | Oishi | 219/145.22 X |

FOREIGN PATENT DOCUMENTS

| 46-24528 | 7/1971 | Japan | 219/146.23 |
| 730531 | 5/1955 | United Kingdom | 148/26 |
| 1190994 | 5/1970 | United Kingdom | 219/145.22 |

*Primary Examiner*—Richard R. Kucia
*Attorney, Agent, or Firm*—Oblon, Fisher, Spivak, McClelland & Maier

[57] ABSTRACT

A composite wire containing a flux for use in gas-shielded arc welding of stainless steels which contains, in the flux, the following inorganic components with respect to the total weight of the wire: 0.1 to 10% by weight of an anhydrous silicate, and 0.01 to 0.75% of a metallic oxide having a melting point of no more than 888° C.

7 Claims, No Drawings

COMPOSITE WIRE FOR STAINLESS STEEL WELDING

BACKGROUND OF THE INVENTION

1. Field of the Invention

This invention relates to a composite wire for stainless steel welding, and more particularly to a wire for use in gas-shielded arc welding which provides a high degree of separability of slag from the surface of beads.

2. Description of the Prior Art

Inert gases, for example, Ar, He and $CO_2$ (partially mixed with $O_2$) are widely used alone or in combination as a shield gas in the art of gas-shield arc welding. For example, MIG welding in an inert gas atmosphere requires the use of a slight amount of $CO_2$ gas or $O_2$ gas due to the fact that the arc is less stable though the appearance of beads is satisfactory without formation of any slag. This leads to increased workability but results in the disadvantage that alloy ingredients tend to be oxidized and become exhausted readily in moving in the form of droplets and finally attach in part to the surface of the beads in the form of a slag. With a Cr containing alloy as used in welding stainless steels, a high melting point slag containing chromium oxide is developed and attached tightly to the surface of the beads. Failure to remove the slag prior to the welding of a next succeeding layer results in blow-holes, inferior fusion, etc. and the procedure of slag removal is therefore mandatory. An obstinate slag could only be removed by grinding or other hard work. We proposed, in Japanese laid-open Patent Application 129188/1978 for instance, a wire providing for easy slag separation, and has made further studies.

SUMMARY OF THE INVENTION

Whereas the earlier proposed wire is a composite wire which contains an alkaline inorganic fluoride as a flux component, the present invention provides a new composite wire containing within a flux inorganic components which meets the following two requirements:

$0.1\% \leq$ silicate $\leq 10\%$ (% by weight); and $0.01\% \leq$ a low melting point metallic oxide $\leq 0.75\%$ Inert gas, carbon dioxide gas or a mixed gas thereof is available as a shield gas when using the wire of the present invention, while the composition of the wire should be adjusted in accordance with the gas used, the above requirements are essential and indispensable for the present invention. Specific embodiments as set forth in the following disclosure and the appended claims should not be limited thereto and are intended to encompass modifications and changes exerting no adverse influence on the gist of the present invention within the scope of the present invention.

DETAILED DESCRIPTION OF THE PREFERRED EMBODIMENTS

Silicate which is the first essential component may, for example, be sodium or potassium silicate such as silica sand, soda feldspar, potash feldspar, anhydrous sodium silicate and anhydrous potassium silicate, with the tendency that it spreads over the surface of the beads in such a manner as to enclose metallic oxides developed in the welding atmosphere. This also allows the beads to assume an excellent shape with a decreased wetting angle. Accordingly, it is not possible that the slag may attach tightly to the surface of the beads as experienced in MIG welding using a solid wire suitable for carbon deoxide gas arc welding, thus enhancing separability of the slag. Silicate is further effective in ensuring stability of the arc and enabling low spatter welding due to the stabilized arc no matter what shield gas is contained. For carbon dioxide gas arc welding there is a trend to increase the carbon content of the weld deposit due to thermal decomposition of the shield gas and lower corrosion resistance especially in the case of stainless steels. The silicate suppresses this tendency and assists to form a low carbon weld deposit comparable to that obtained by inert gas arc welding and prevent interfacial corrosion. The kind of the silicate is discussed above is only illustrative and should not be limitative.

The beneficial effects of the silicate are insignificant to carbon dioxide gas arc welding as long as the silicate content falls below 0.1%. On the other hand, when the silicate proportion is in excess of 10%, the silicon oxide in the silicate which is generally easy to reduce under the influence of a deoxidizer produces the problem that an increased amount of silicon moves toward the weld deposite. An upper limit of the silicate content is 10% and the use of only the silicate can not exhibit enhancing of separability of the slag as originally expected.

The inventors have found advisable to add such a low melting point metallic oxide as lead oxide, copper oxide, bismuth oxide, antimony oxide and tin oxide. These oxides are useful in enhancing the separability of the slag without affecting the stability of the arc. This advantage is not available without oxide contents more than 0.1%. However, when the oxide content exceeds 0.75%, there are causes of deteriorating workability, for example, the occurrence of spatters and weak affinity of a weld metal and incurring dangerous situations such as cracking. More preferable range is from 0.1 to 0.25%. It is understood that the kind of the low melting point metallic oxides should not be limitative to those specified above.

The wire according to the present invention contains the above stated two types of components in a flux with their involving effects of improving the stability of the arc and the separability of the slag. If desirable, there may be added rutile, titanium calcium, a titanium slag or any other Ti oxides and/or zirconia, zirconium sand or any other Zr oxides. Those oxides are to increase the separability of the slag without keeping the arc stable and have an upper permissible limit of 4%. However, more than 4% of those oxides impair the stability of the arc and cause dangerous spatters.

In addition to the above mentioned alloy ingredients, the flux according to the present invention may contain other additives available now and in future, for example, a slag forming agent, an arc stabilizer and a deoxidizer. However, carbonates such as $CaCO_3$, $MnCO_3$, $SrCO_3$ and $BaCO_3$ and fluorides such as $CaF_2$ are undesirable because they impair the stability of the arc and often give rise to spatters, blowholes and welding defects such as inferior fusion. Even if the use of those additives is inevitable for any reason, the former should be less than 0.2% (a conversion value of $CO_2$) and the latter less than 1.5%.

The alloy ingredients in the wire according to the present invention will now be discussed in detail. The alloy ingredients are applied in powder to the flux and/or to the wire sheath. For the welding of stainless steels the wire of the present invention contains Cr, Ni and Si as principal ingredients and, if the occasion arises, Ni, Mo, Ti, Al, Nb and Ta. These ingredients are present in the following relationship:

$$10\% \leq f \cdot F(Cr) + (1-f) \cdot C(Cr) \leq 35\%$$

$$0.1\% \leq f \cdot F(Mn) + (1-f) \cdot C(Mn) \leq 10\%$$

$$0.1\% \leq f \cdot F(Si) + (1-f) \cdot C(Si) \leq 1\%$$

$$0\% \leq f \cdot F(Ni) + (1-f) \cdot C(Ni) \leq 25\%$$

$$0\% \leq f \cdot F(Mo) + (1-f) \cdot C(Mo) \leq 7\%$$

$$0\% \leq f \cdot F(Ti+Al) + (1-f) \cdot C(Ti+Al) \leq 2\%$$

$$0\% \leq f \cdot F(Nb+Ta) + (1-f) \cdot C(Nb+Ta) \leq 1.5\%$$

wherein f is the ratio of the weight of the flux to that of the wire, F( ) is the alloy ingredient % in the flux and C( ) is the alloy ingredient % in the wire sheath. The respective contents as defined above should be determined in consideration of yields (indications of the amounts of the ingredients moving into the weld deposit) which vary in accordance with the kind of the shield gas used. In other words, these yields are Cr: 90%; Mn: 60%, Si: 60%, Ni: 95%; Mo: 90%, Ti: 10%, Al: 10%, Nb: 60% and Ta: 60%, in the case of $CO_2$ shield gas, and Cr: 95%, Mn: 60%, Si: 60%, Ni: 100%, Mo: 95%, Ti: 50%, Al: 50%, Nb: 80% and Ta: 80% in the case of Ar shield gas.

Cr serves to increase the corrosion resistance of a weld zone and is necessary when an object to be welded is stainless steel and should be within a range from an upper limit to a lower limit both of which must meet the above requisites. The lower limit is an amount necessary for Cr to exhibit corrosion resistance, while the upper limit is an amount over which ductility drops and fragility rises drastically at high temperatures. Mn serves as both a deoxidizer and a devulcanizing agent as well as preventing welding cracks. Since Mn further acts as an arc stabilizer, at least 0.1% of Mn is necessary. Unfavorably, an excessive amount of Mn more than 10% results in damaging the stability of the arc and the separability of the slag. A minimum content of Si is 0.1% since Si is useful as a deoxidizer and serves to improve affinity. The upper limit of Si over which crack sensitivity increases is determined at 1%. Although Mn and Si have been described as the important ingredients, one of the two ingredients can be eliminated in some of applications of the wire when the amount of the other ingredient is somewhat greater.

Ni is to enhance the ductility and corrosion resistance of the weld zone. Since more than 25% Ni shows a tendency of deteriorating crack resistance, its permissible upper limit is defined at 15%, Ni is not always necessary and whether Ni is to be added is decided by the type of steel to be welded, applications and other factors. Mo is effective to increase corrosion resistance under a non-oxidizing atmosphere. Mo exceeding the upper limit as defined by the above formulas, however, decreases ductility. For this reason Mo should be within the range as defined by the formulas but in some cases becomes unnecessary depending upon the type of the steel to be welded and applications of welded products, etc.

Ti and Al are both a deoxidizer with the former effective to stabilize the arc and enhance the interfacial corrosion resistance. An excessive amount of Ti and Al makes the arc unstable and especially the latter impaires the separability of the slag. Therefore, the upper limit of the former is 1.5% and that of the latter is 1%. When the both are used together, the total upper limit is set at 2%.

Nb and Ta are an element which serves to increase the interfacial corrosion resistance. Due to the fact that an excessive amount of Nb or Ta leads to an increased crack sensitibity, the upper limits of the individual ingredients are Ni: 2% and Ta: 2% and, when the both are mixed, the total upper limit should also be 2%.

As previously stated, the respective alloy ingredients are added to the flux or the wire sheath. No particular limitation is placed on the metallic composition of the wire sheath. It is however more desirable that the sheath contain a ferritic stainless steel with hard hardening properties or an austenite steel with no advere effect on seam welding of a hoop during the manufacture of the composite wire. In the case of ferritic stainless steel, it is possible that crystal grains may become coarse to cause a break in the weld zone. As long as the wire contains Ti and/or Al, no problem with productivity arises due to the coarse crystal grains.

Specific embodiments of the present invention will now be discussed.

EXAMPLE 1

On a hoop of SUS 430, measuring 0.7 mm thick and 12 mm wide, there was disposed a flux of the composition presented in Table 1. Subsequent to bending and scribing a 1.6 mm $\phi$ composite wire was fabricated (the formation of a weld deposit D 308, flux factor: 25%). Butt welding took place with DCRP (welding current: 800 A and welding voltage: 31 V) while $CO_2$ was used as a shield gas (flow rate: 20 l/min). The configuration of a groove was: thickness 19 mm, shape "V", groove angle 45 degrees, root height 3 mm, root gap substantially 0. The base metal used was SUS 304 L. The alloying ingredient contents of a wire sheath are given in Table 2 and the chemical composition of a weld metal is indicated in Table 3.

TABLE 1

| Ingredient | Content | Ingredient | Content |
|---|---|---|---|
| Electrolytic Cr | 34 | Silica sand | 10 |
| Electrolytic Ni | 38 | Calcium titanate | 2 |
| Electrolytic Mn | 4 | Iron filings | 10.9 |
| Fe—Si | 0.9 | Copper oxide | 0.2 |
| | | | (%) |

TABLE 2

| C | Mn | Si | Ni | Cr |
|---|---|---|---|---|
| 0.02 | 0.4 | 0.6 | 0.01 | 17 |
| | | | | (%) |

TABLE 3

| C | Mn | Si | Ni | Cr |
|---|---|---|---|---|
| 0.03 | 0.85 | 0.44 | 9.3 | 20.8 |
| | | | | (%) |

In the above example, the arc exhibited excellent stability with an attendant increase in workability. The results of X-ray tests fell into the first grade of the JIS and the resulting weld zone was satisfactory in side bend, face bend and rood bend and was free of any crack. The results of tensile tests of typical weld deposits are listed in Table (immediately after welding).

TABLE 4

| 0.2% endurance (Kg/mm²) | Tensile strength (Kg/mm²) | Elongation (%) | Contraction (%) |
|---|---|---|---|
| 39.5 | 59.2 | 45 | 45 |

EXAMPLE 2

The following experiments were conducted in order to observe the effects and more particularly involving effects of the silicate, the low melting point metallic oxides and the Ti oxides. Feldspar, bismuth oxide and rutile were selected as representative compounds. Table 5 shows the effect of feldspar only wherein individual samples in amounts falling within the range as required by the present invention were evaluated as excellent (denoted by a dual circle ⊚) or good (denoted by a single circle ○) in arc stability, quantity of spatters, envelopment of a slag and bead shape but poor (as denoted by a triangle Δ) in respect to slat separability. Samples out of the above defined range were evaluated as poor (Δ) in almost all items including arc stability. The same legends (⊚, ○ and Δ) are used to indicate similar results of evaluation in the following tables.

TABLE 5

| Wire No. | Proportion within entire wire (%) Feldspar | Arc stability | Spatter quantity | Slag envelopment | Slag separability | Bead shape |
|---|---|---|---|---|---|---|
| 1 | 0.05 | Δ | Δ | Δ | Δ | ○ |
| 2 | 2.0 | ○ | ○ | ○ | Δ | ⊚ |
| 3 | 4.0 | ⊚ | ⊚ | ⊚ | Δ | ⊚ |
| 4 | 7.0 | ⊚ | ⊚ | ⊚ | Δ | ⊚ |
| 5 | 10.0 | ○ | ○ | ○ | Δ | ⊚ |
| 6 | 13.0 | Δ | Δ | Δ | Δ | ⊚ |

Bithmuth oxide was further added as viewed in Table 6 due to the face that the use of feldspar only was found unsatisfactory for the purpose of the present invention.

TABLE 6

| Wire No. | Proportion within entire wire (%) Feldspar | Bismuth oxide | Arc stability | Spatter quantity | Slag envelopment | Slag separability | Bead shape |
|---|---|---|---|---|---|---|---|
| 7 | 4 | 0.01 | ⊚ | ⊚ | ⊚ | ⊚ | ⊚ |
| 8 | 4 | 0.06 | ⊚ | ⊚ | ⊚ | ⊚ | ⊚ |
| 9 | 4 | 0.10 | ⊚ | ⊚ | ⊚ | ⊚ | ⊚ |
| 10 | 4 | 0.25 | ⊚ | ⊚ | ⊚ | ⊚ | ⊚ |
| 11 | 4 | 0.75 | ⊚ | ⊚ | ⊚ | ⊚ | ○ |
| 12 | 4 | 1.25 | ⊚ | ⊚ | ⊚ | ⊚ | Δ |
| 13 | 4 | 2.25 | ⊚ | ⊚ | ⊚ | ⊚ | Δ |

It is evident from Table 6 that samples No. 7–No. 11 meeting the requisites of the present invention gave excellent results and particularly significant advantages of allowing the slag to be more easily removable.

In order to observe the effects of the Ti oxides or Zr oxides, sample wires cored with fluxes of which the compositions are shown in Table 7 and examined in a similar manner. Sample wires No. 20–No. 23 and No. 28 falling within the scope of the present invention were evaluated as excellent ( ) in all items. It is noted that Table 8 shows the total content of each alloy ingredient (a sum of its amount in the flux and its amount in the wire sheath) of sample wires No. 1–No. 24. Cr was added to only the hoop and the flux factor was 28%.

TABLE 7

| Wire No. | Proportion within entire wire (%) Feldspar | Rutile | Bismuth oxide | Arc stability | Spatter quantity | Slag envelopment | Slag separability | Bead shape |
|---|---|---|---|---|---|---|---|---|
| 14 | 5 | 1 | — | ⊚ | ⊚ | ⊚ | ○~Δ | ⊚ |
| 15 | 5 | 2 | — | ⊚ | ⊚ | ⊚ | ○~Δ | ⊚ |
| 16 | 5 | 5 | — | ○ | ○ | ○ | ○~Δ | ⊚ |
| 17 | 5 | 7 | — | ○ | ○ | ○ | ○~Δ | ○ |
| 18 | 5 | 9 | — | Δ | Δ | ○ | ○~Δ | ○ |
| 19 | 5 | 2 | 0.005 | ⊚ | ⊚ | ⊚ | Δ | ⊚ |
| 20 | 5 | 2 | 0.01 | ⊚ | ⊚ | ⊚ | ⊚ | ⊚ |
| 21 | 5 | 2 | 0.06 | ⊚ | ⊚ | ⊚ | ⊚ | ⊚ |
| 22 | 5 | 2 | 0.10 | ⊚ | ⊚ | ⊚ | ⊚ | ⊚ |
| 23 | 5 | 2 | 0.75 | ⊚ | ⊚ | ⊚ | ⊚ | ⊚ |
| 24 | 5 | 2 | 1.25 | ⊚ | ⊚ | ○ | ⊚ | Δ |
| 25 | 5 | 1* | — | ⊚ | ⊚ | ⊚ | ○ | ⊚ |
| 26 | 5 | 2* | — | ⊚ | ⊚ | ⊚ | ○ | ⊚ |
| 27 | 5 | 5* | — | ○ | ○ | ○ | ○ | ⊚ |
| 28 | 5 | 1* | 0.01 | ⊚ | ⊚ | ⊚ | ⊚ | ⊚ |

*Zirconium sand

TABLE 8

| Wire No. | Ni | Cr | Mn | Fe |
|---|---|---|---|---|
| 1 | 10.0 | 19.44 | 2.5 | 67.92 |
| 2 | 9.8 | 19.44 | 2.5 | 66.26 |
| 3 | 9.6 | 19.44 | 2.5 | 64.42 |
| 4 | 9.8 | 19.44 | 2.5 | 61.76 |
| 5 | 8.9 | 19.44 | 2.5 | 59.16 |
| 6 | 8.7 | 19.44 | 2.5 | 56.36 |
| 7 | 9.6 | 19.44 | 2.5 | 64.45 |
| 8 | 9.6 | 19.44 | 2.5 | 64.40 |
| 9 | 9.6 | 19.44 | 2.5 | 64.36 |
| 10 | 9.6 | 19.44 | 2.5 | 64.21 |
| 11 | 9.5 | 19.44 | 2.5 | 63.81 |
| 12 | 9.5 | 19.44 | 2.5 | 63.31 |
| 13 | 9.4 | 19.44 | 2.5 | 62.41 |
| 14 | 9.5 | 19.44 | 2.5 | 68.86 |
| 15 | 9.3 | 19.44 | 2.5 | 62.76 |
| 16 | 9.1 | 19.44 | 2.5 | 59.96 |
| 17 | 8.9 | 19.44 | 2.5 | 58.16 |
| 18 | 8.7 | 19.44 | 2.5 | 56.36 |
| 19 | 9.3 | 19.44 | 2.5 | 56.36 |
| 20 | 9.3 | 19.44 | 2.5 | 61.75 |
| 21 | 9.8 | 19.44 | 2.5 | 61.70 |
| 22 | 9.8 | 19.44 | 2.5 | 61.66 |
| 23 | 9.3 | 19.44 | 2.5 | 61.51 |
| 24 | 9.2 | 19.44 | 2.5 | 60.61 |
| 25 | 9.5 | 19.44 | 2.5 | 68.86 |
| 26 | 9.3 | 19.44 | 2.5 | 62.76 |
| 27 | 9.1 | 19.44 | 2.5 | 59.96 |
| 28 | 9.3 | 19.44 | 2.5 | 62.76 |

As noted earlier, the present invention ensures a higher degree of separability of the slag without affecting the stability of the arc. This leads to increased workability of stainless steel welding and enables complete prevention of welding defects which are caused due to difficulty in removing the slag.

What is claimed as new and desired to be secured by letters patent of the United States is:

1. A composite wire containing a flux for use in gas-shielded arc welding of stainless steels, wherein said flux contains the following inorganic components with respect to the total weight of said wire:
   0.1% ≦ anhydrous silicate ≦ 10%; and
   0.01% ≦ a low melting metallic oxide having a melting point of no more than 888° C. ≦ 0.75%.

2. A composite wire of claim 1 wherein said inorganic components in said flux comprise Ti oxide or Zr oxide in amounts not more than 4%.

3. A composite wire of claim 1 wherein the carbonate content of said inorganic components of said flux is 0.2% or less in terms of $CO_2$.

4. A composite wire of claim 1, wherein the fluoride content of said inorganic components of said flux is 1.5% or less.

5. A composite wire of claim 1, wherein said low melting metallic oxide comprises one or more members selected from the group consisting of lead oxide, bismuth oxide, and antimony oxide.

6. A composite wire of claim 1, wherein said flux contains said low melting metallic oxide in the range of 0.01 to b 0.25 wt. % with respect to the total weight of said wire.

7. A composite wire according to claim 1, 2, 3, 4 or 5 comprising a wire sheath and a filling flux wherein the following alloy ingredients of said wire are present in said wire sheath and said filling flux in the following relationship:

$$10\% \leq f \cdot F(Cr) + (1-f) \cdot C(Cr) \leq 35\%$$

$$0.1\% \leq f \cdot F(Mn) + (1-f) \cdot C(Mn) \leq 10\%$$

$$0.1\% \leq f \cdot F(Si) + (1-f) \cdot C(Si) \leq 1\%$$

$$0\% \leq f \cdot F(Ni) + (1-f) \cdot C(Ni) \leq 25\%$$

$$0\% \leq f \cdot (MO) + (1-f) \cdot C(Mo) \leq 7\%$$

$$0\% \leq f \cdot F(Ti+Al) + (1-f) \cdot C(Ti+Al) \leq 2\%$$

$$0\% \leq f \cdot F(Nb+Ta) + (1-f) \cdot C(Nb+Ta) \leq 1.5\%$$

wherein f is the ratio of the weight of the filling flux to the weight of the wire sheath, F( ) is the alloy ingredient % in the filling flux and C( ) is the alloy ingredient % in the wire sheath.

* * * * *

UNITED STATES PATENT AND TRADEMARK OFFICE
CERTIFICATE OF CORRECTION

PATENT NO. : 4,345,140
DATED : August 17, 1982
INVENTOR(S) : TOMOKAZU GODAI ET AL It is certified that error appears in the above—identified patent and that said Letters Patent is hereby corrected as shown below:

In column 2, line 32, "0.1%" should read --0.01%--.

In column 5, line 39, "face" should read --fact--;

line 66, "( )" should read --(◎)--.

In Claim 6, line 3, "b 0.25" should read --0.25--.

Signed and Sealed this

Twenty-sixth Day of October 1982

[SEAL]

Attest:

GERALD J. MOSSINGHOFF

Attesting Officer

Commissioner of Patents and Trademarks